(12) United States Patent
Ngo et al.

(10) Patent No.: US 10,081,303 B1
(45) Date of Patent: Sep. 25, 2018

(54) FULL SIZE TAILGATE STEP

(71) Applicant: FORD GLOBAL TECHNOLOGIES, LLC, Dearborn, MI (US)

(72) Inventors: Tom Thanh Ngo, Troy, MI (US); Martin Countegan, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/583,064

(22) Filed: May 1, 2017

(51) Int. Cl.
*B62D 33/03* (2006.01)
*B60R 3/02* (2006.01)
*B62D 33/027* (2006.01)

(52) U.S. Cl.
CPC ............ *B60R 3/02* (2013.01); *B62D 33/0273* (2013.01); *B62D 33/03* (2013.01)

(58) Field of Classification Search
CPC ........ B62D 33/0273; B62D 33/03; B60R 3/02
USPC ..................... 296/50, 51, 57.1, 62
See application file for complete search history.

(56) References Cited

U.S. PATENT DOCUMENTS

| | | | | |
|---|---|---|---|---|
| 3,004,790 A | * | 10/1961 | Mayer | B60R 5/041 296/26.09 |
| 3,637,097 A | | 1/1972 | Horowitz | |
| 4,813,842 A | | 3/1989 | Morton | |
| 4,846,487 A | * | 7/1989 | Criley | B60R 3/02 105/447 |
| 5,788,311 A | * | 8/1998 | Tibbals | B62D 33/0273 296/26.11 |
| 6,270,139 B1 | * | 8/2001 | Simpson | B60P 1/435 296/26.01 |
| 6,857,680 B2 | * | 2/2005 | Fielding | B60N 2/3015 280/166 |
| 6,918,624 B2 | * | 7/2005 | Miller | B60P 3/40 182/127 |
| 6,966,597 B2 | | 11/2005 | Tegtmeier | |
| 6,976,820 B2 | * | 12/2005 | Sandy | B60P 1/4414 296/62 |
| 7,073,837 B2 | * | 7/2006 | Madlinger | B62D 33/03 296/57.1 |
| 7,232,173 B2 | * | 6/2007 | Katterloher | B60R 3/02 296/50 |
| 7,347,473 B2 | | 3/2008 | Miller et al. | |
| 7,909,381 B2 | | 3/2011 | King et al. | |
| 8,348,325 B2 | | 1/2013 | Hausler et al. | |

(Continued)

OTHER PUBLICATIONS

"Truck N' Buddy Magnum Tailgate Step", http://www.truck-n-buddy.com.

*Primary Examiner* — Gregory A Blankenship
(74) *Attorney, Agent, or Firm* — Carlson, Gaskey & Olds, P.C.

(57) ABSTRACT

An apparatus, according to an exemplary aspect of the present disclosure includes, among other things, a rail assembly supported by a vehicle body, a tailgate coupled to the rail assembly and configured to slide on rails to an extended position relative to the vehicle body, and a pivot associated with the rails to allow the tailgate to pivot downwardly from the extended position to provide a step. A method according to an exemplary aspect of the present disclosure includes, among other things, sliding a tailgate to an extended position relative to a vehicle body and selectively pivoting the tailgate between a closed position, a tailgate deployed position, and a step position.

21 Claims, 11 Drawing Sheets

(56) References Cited

U.S. PATENT DOCUMENTS

| | | | |
|---|---|---|---|
| 2002/0070577 A1* | 6/2002 | Pool, III | B60R 3/02 296/62 |
| 2007/0228761 A1* | 10/2007 | Dryja | B60R 3/02 296/62 |
| 2008/0277958 A1* | 11/2008 | King | B62D 33/0273 296/39.2 |
| 2010/0037528 A1* | 2/2010 | Lambright | B60P 1/438 49/347 |
| 2011/0057469 A1* | 3/2011 | Zielinsky | B60P 1/267 296/57.1 |
| 2012/0228893 A1* | 9/2012 | Lu | B62D 33/0273 296/26.11 |
| 2016/0160553 A1* | 6/2016 | Nania | E05F 15/627 296/50 |
| 2016/0214657 A1* | 7/2016 | Topolovec | B62D 33/027 |
| 2017/0282979 A1* | 10/2017 | Singer | B62D 33/0273 |
| 2018/0065689 A1* | 3/2018 | Reiners | B62D 33/0273 |

\* cited by examiner

FULL SIZE TAILGATE STEP

TECHNICAL FIELD

This disclosure relates to an exemplary apparatus and method of providing a full size tailgate step for a vehicle.

BACKGROUND

Vehicles such as pickup trucks, for example, include a cargo bed area that is used to transport various types of items. The vehicle typically includes a tailgate that encloses one end of the cargo bed area and which can be pivoted to an open position to provide access to the cargo bed area. When in the open position, cargo can be removed from, or loaded into, the cargo bed area. The cargo bed area is elevated relative to ground level, which can make access to cargo more difficult even when the tailgate is in the open position. Further, it is often necessary to climb into the cargo bed area to access items that are out of reach; however, due to the high ground clearance, ingress and egress can be difficult.

SUMMARY

An apparatus according to an exemplary aspect of the present disclosure includes, among other things, a rail assembly supported by a vehicle body, a tailgate coupled to the rail assembly and configured to slide on rails to an extended position relative to the vehicle body, and a pivot associated with the rails to allow the tailgate to pivot downwardly from the extended position to provide a step.

In a further non-limiting embodiment of the foregoing apparatus, the rail assembly comprises a plurality of rail members that are in a telescoping relationship with each other.

In a further non-limiting embodiment of either of the foregoing apparatus, the pivot comprises a pivotal connection to at least one rail member.

In a further non-limiting embodiment of any of the foregoing apparatus, the tailgate includes an external surface and an inner surface that faces a vehicle cargo bed when in a closed position, and wherein the inner surface provides a step surface when the tailgate is pivoted to a step position.

In a further non-limiting embodiment of any of the foregoing apparatus, the step surface extends across an entire width and height of the tailgate and is generally parallel to ground level when in the step position.

In a further non-limiting embodiment of any of the foregoing apparatus, the apparatus includes a latch that is selectively actuated to allow the tailgate to slide from a closed position to the extended position.

In a further non-limiting embodiment of any of the foregoing apparatus, the apparatus includes a load assist to provide assistance to move the tailgate between a closed position and a step position.

In a further non-limiting embodiment of any of the foregoing apparatus, the load assist comprises a spring assembly mounted to the vehicle body.

In a further non-limiting embodiment of any of the foregoing apparatus, the spring assembly is coupled to a cable that is wound around at least first and second pulleys, and including a stop moveable with the cable and that stops at the first pulley in the closed position and stops at the second pulley in the step position.

In a further non-limiting embodiment of any of the foregoing apparatus, the cable is coupled to the tailgate and includes an attachment portion that is secured to the vehicle body to allow the tailgate to pivot to a tailgate deployed position that is between the closed position and step position, and wherein the attachment portion is released from the vehicle body to allow the cable to extend from the vehicle body to lower the tailgate to the step position.

In a further non-limiting embodiment of any of the foregoing apparatus, the attachment portion comprises a loop, and including a post fixed to the vehicle body wherein the loop is coupled to the post when in the tailgate deployed position, and wherein the loop is detached from the post when in the step position.

A apparatus according to another exemplary aspect of the present disclosure includes, among other things, a pair of rails supported on opposing sides of a vehicle body, a tailgate slidingly coupled to the rails, and a load assist to provide assistance to move the tailgate between a closed position, a tailgate deployed position, and a step position.

In a further non-limiting embodiment of any of the foregoing apparatus, the tailgate slides on the rails to an extended position relative to the vehicle body, and including a pivot associated with the rails to allow the tailgate to pivot downwardly from the extended position to the step position.

In a further non-limiting embodiment of any of the foregoing apparatus, each rail comprises a plurality of rail members that are in a telescoping relationship with each other, and wherein the pivot comprises a pivotal connection to at least one rail member.

In a further non-limiting embodiment of any of the foregoing apparatus, the apparatus includes a latch that is selectively actuated allow the tailgate to slide from the closed position to the extended position.

In a further non-limiting embodiment of any of the foregoing apparatus, the load assist comprises a spring assembly mounted to the vehicle body, a cable coupled to the spring assembly and which is wound around at least first and second pulleys, and a stop moveable with the cable to stop at the first pulley in the closed position and to stop at the second pulley in the step position.

In a further non-limiting embodiment of any of the foregoing apparatus, the cable is coupled to the tailgate and includes an attachment portion that is secured to the vehicle body to allow the tailgate to pivot to the tailgate deployed position, and wherein the attachment portion is released from the vehicle body to allow the cable to extend from the vehicle body to lower the tailgate to the step position.

A method according to another exemplary aspect of the present disclosure includes the steps of, among other things: sliding a tailgate to an extended position relative to a vehicle body, and selectively pivoting the tailgate between a closed position, a tailgate deployed position, and a step position.

In a further non-limiting embodiment of the foregoing method, the method includes providing a load assist with a spring and cable assembly to move the tailgate between the closed, tailgate deployed, and step positions. In a further non-limiting embodiment of either of the foregoing methods, the method includes selectively locking the tailgate to the vehicle body to prevent the tailgate from being moved to the extended position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 9A is an enlarged view of the identified portion of FIG. 9.

DETAILED DESCRIPTION

This disclosure details exemplary apparatus and methods of providing a full size tailgate step for a vehicle. These and other features are discussed in greater detail in the following paragraphs of this detailed description.

Figure 1:
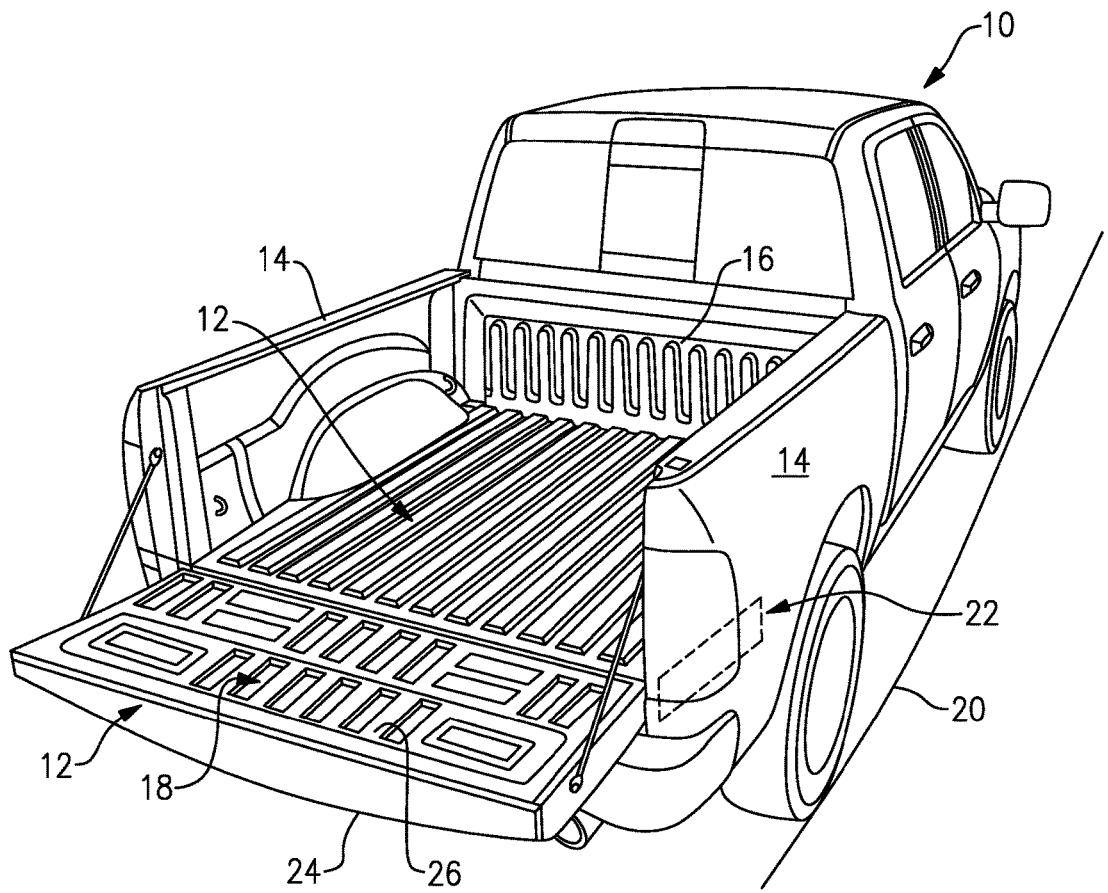
FIG. 1 schematically illustrates a rear right perspective view of a pick-up truck with a tailgate in a tailgate deployed or open position.

FIG. 1 shows a pick-up truck 10 having a cargo bed area 12 that is defined by a pair of side walls 14, a front wall 16, and a tailgate 18. The tailgate 18 is moveable between a closed position (FIG. 2), a normal tailgate deployed or open position (FIG. 1), and a step position (FIG. 8) where the tailgate is lowered closer to ground level 20 to provide a step into the cargo bed area 12. When in the closed position, the tailgate 18 encloses one end of the cargo bed area 12 to prevent items from sliding out from the truck 10. The tailgate 18 is pivoted from the closed position to the open position to provide access to the cargo bed area 12. When in the open position cargo and be loaded and unloaded from the truck 10.

As shown in FIG. 1, the cargo bed area 12 is elevated relative to ground level 20. This can make access to cargo more difficult even when the tailgate 18 is in the open position. Further, the elevated height of the tailgate 18 can be problematic if it is necessary to climb into the cargo bed area 12 to access items that are out of reach and closer to the front wall 16 of the truck 10. To address these issues, an apparatus 22 is provided that allows the tailgate 18 to be pivoted and lowered close to ground level 20 to provide a step. The tailgate 18 has an external surface 24 and an internal surface 26 that faces the cargo bed area 12 when in the closed position. When pivoted and lowered into the step position, the entire internal surface 26 of the tailgate 18 is generally parallel to ground level 20 to provide a full-size step into the cargo bed area.

Figure 2:
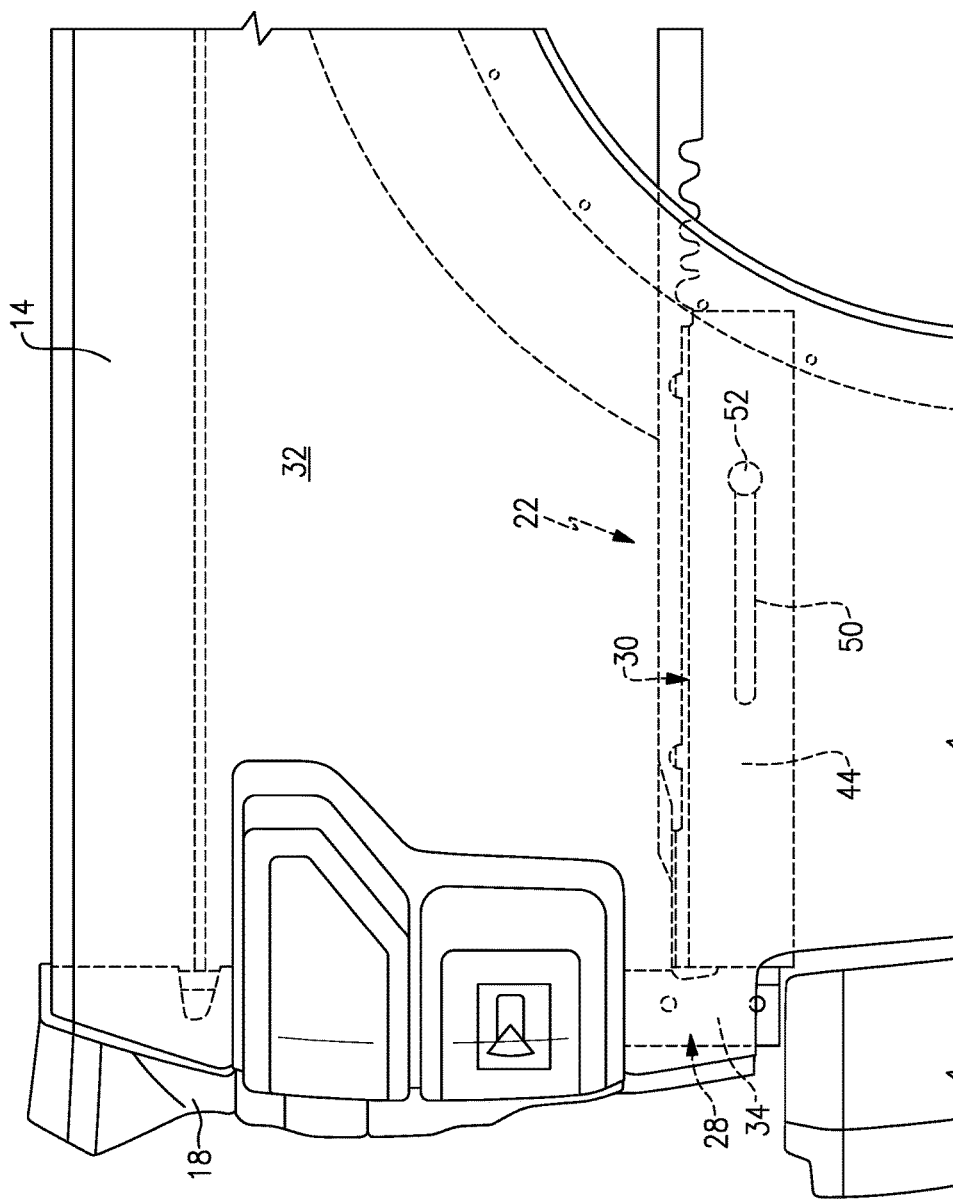
FIG. 2 is a side view of a rear portion of a cargo bed area of the truck of FIG. 1, and which includes an apparatus to move the tailgate to a step position.

This apparatus 22 is shown in greater deal in FIGS. 2-11. The apparatus 22 includes a rail assembly 30 that is supported by a vehicle body 32 as shown in FIG. 2. In one example, the rail assembly 30 is mounted at the sides of the truck 10 underneath the bottom bed of the cargo area 12 and/or within the side walls 14 of the truck 12 in a cavity between inner and outer body panels that form the side wall 14. The rail assembly 30 is comprised of a plurality of rail members or portions that are arranged in a telescoping relationship with each other to allow the tailgate 18 to be extended away from the truck 10. FIG. 2 shows the tailgate 18 in the closed position with the rail assembly 30 in a fully retracted position.

It should be understood that while FIG. 2 shows a rail assembly 30 positioned on one side of the truck 10, a corresponding rail assembly 30 of similar construction is positioned on an opposite side of the truck 10 such that opposing sides of the tailgate 18 can slide outwardly from the truck 10 in a balanced manner.

Figure 3:
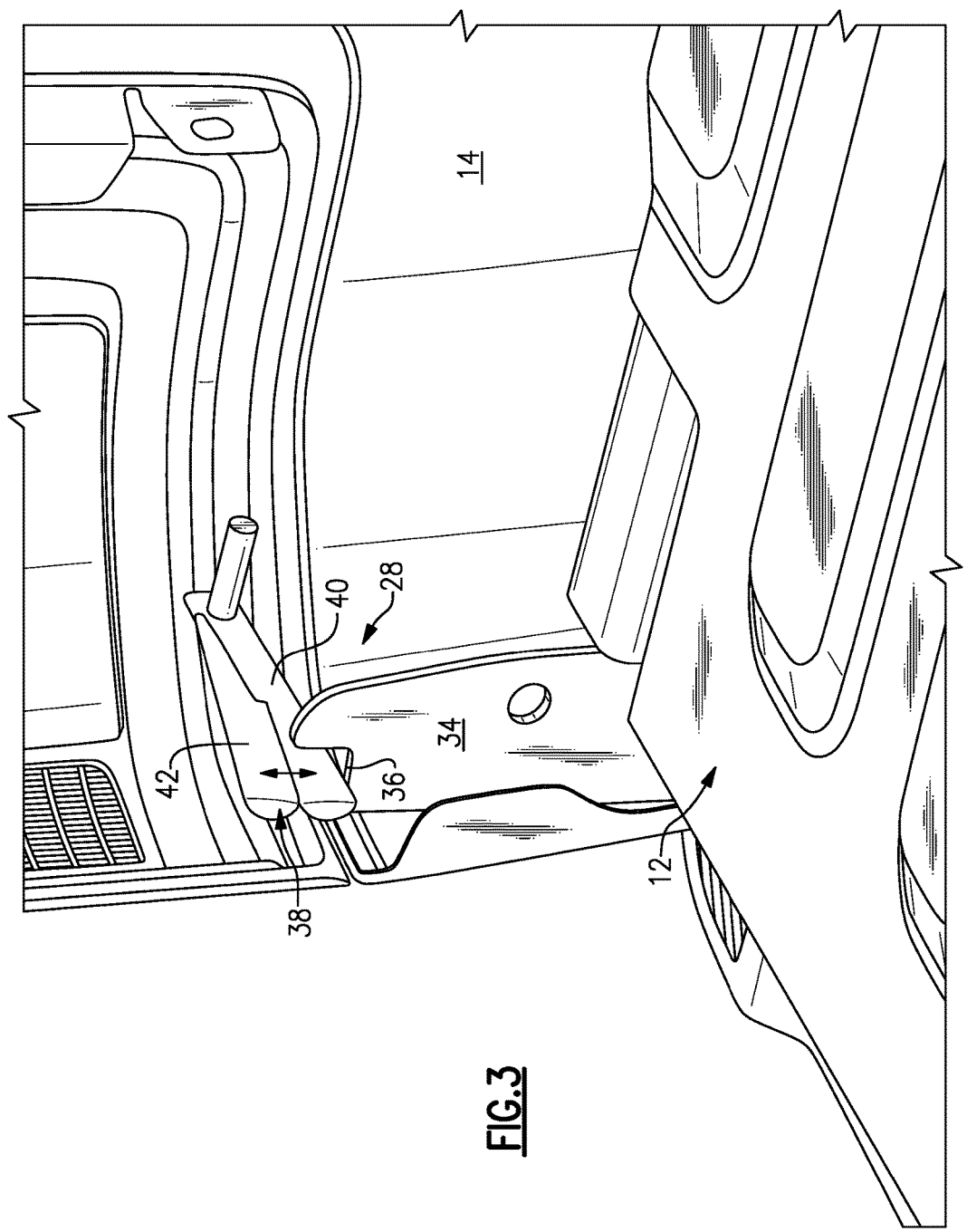
FIG. 3 is an enlarged perspective view of a latch mechanism that is selectively actuated to move the tailgate to the extended position.

FIG. 2 also shows a latch mechanism 28 that is selectively actuated to allow the tailgate 18 to slide away from the side walls 14 via the rail assembly 30 to the extended position. In one example, the latch mechanism 28 comprises a bracket 34 that is mounted for movement with the tailgate 18. FIG. 3 shows an enlarged view of the bracket 34 with the tailgate 18 removed for the purpose of clarity. In one example, the bracket 34 comprises a flat body that is elongated in a vertical direction to extend along an edge of the tailgate 18. The flat body includes a notch 36 that cooperates with a lever 38 that is mounted to the vehicle body 32. The lever 38 is selectively moveable between a first position 40 and a second position 42. In the first position 40, the lever 38 is received within the notch 36 to prevent the tailgate 18 from sliding outwardly from the vehicle body 32. In the second position 42, the lever 38 is released from the notch 36 to allow the tailgate 18 to slide to the extended position.

Figure 4:
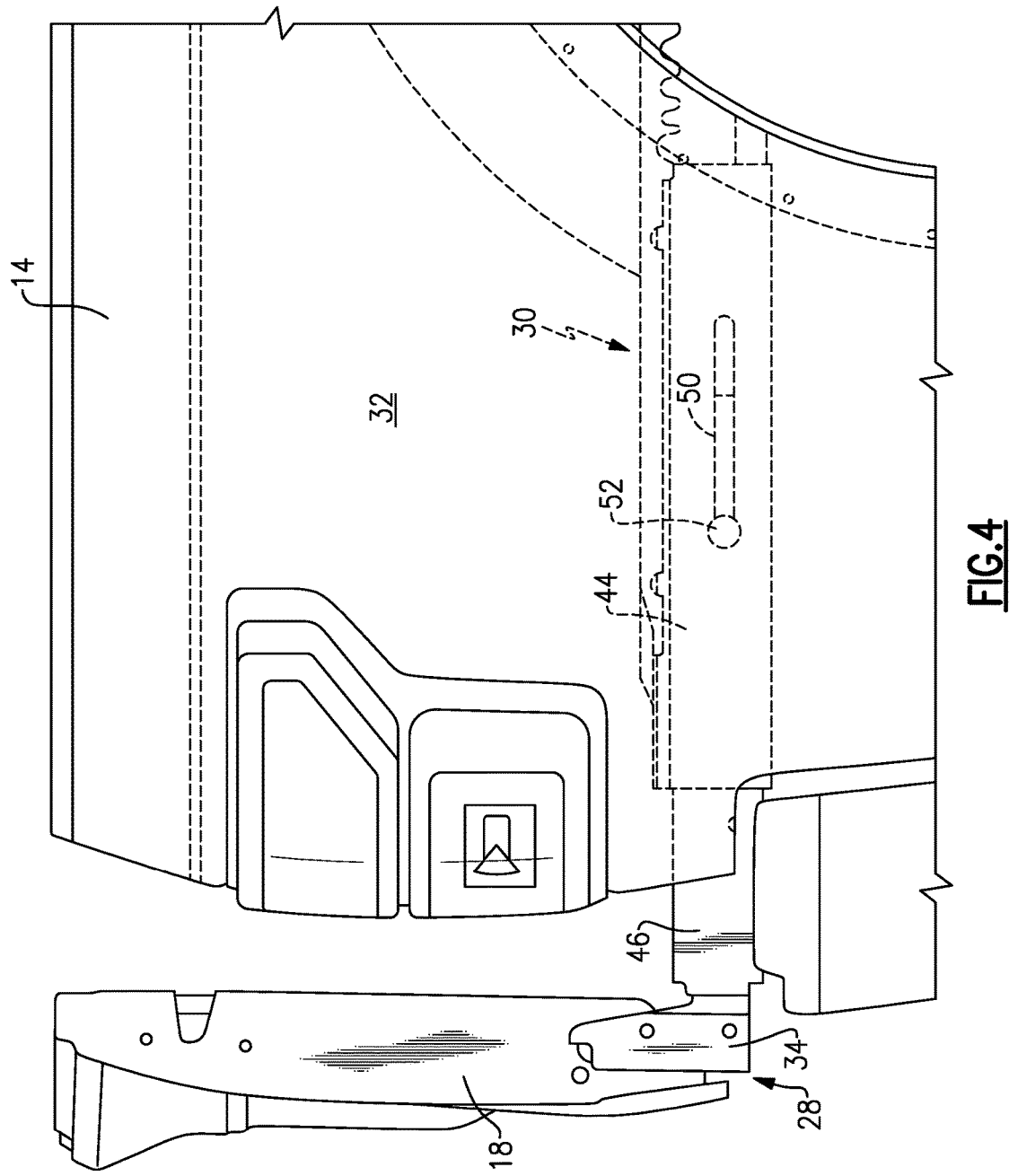
FIG. 4 is similar to FIG. 2 but shows the tailgate sliding to an extended position relative to the vehicle body.
Figure 5:
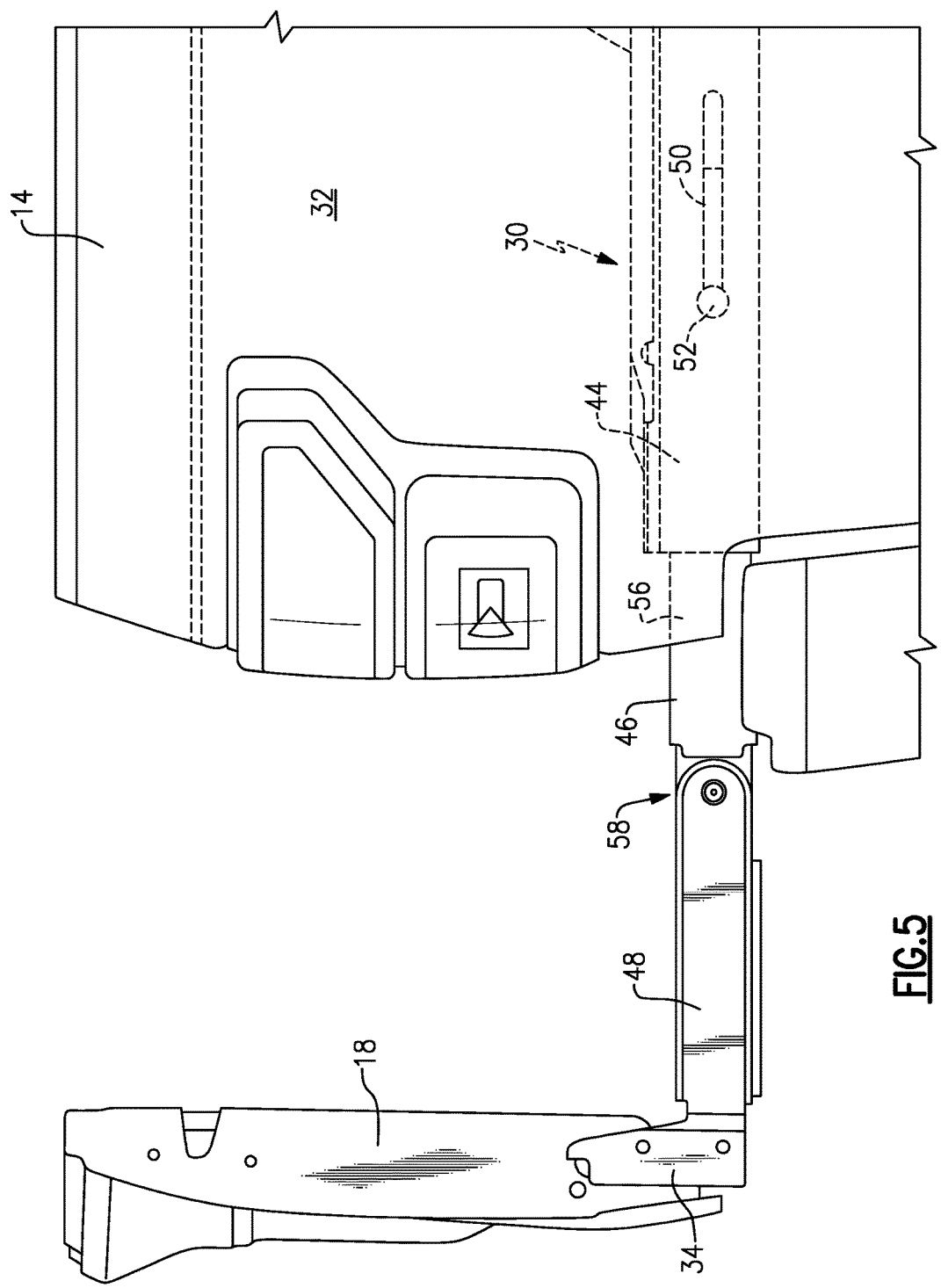
FIG. 5 is a view similar to FIG. 3 but showing the tailgate in a fully extended position.
Figure 6:
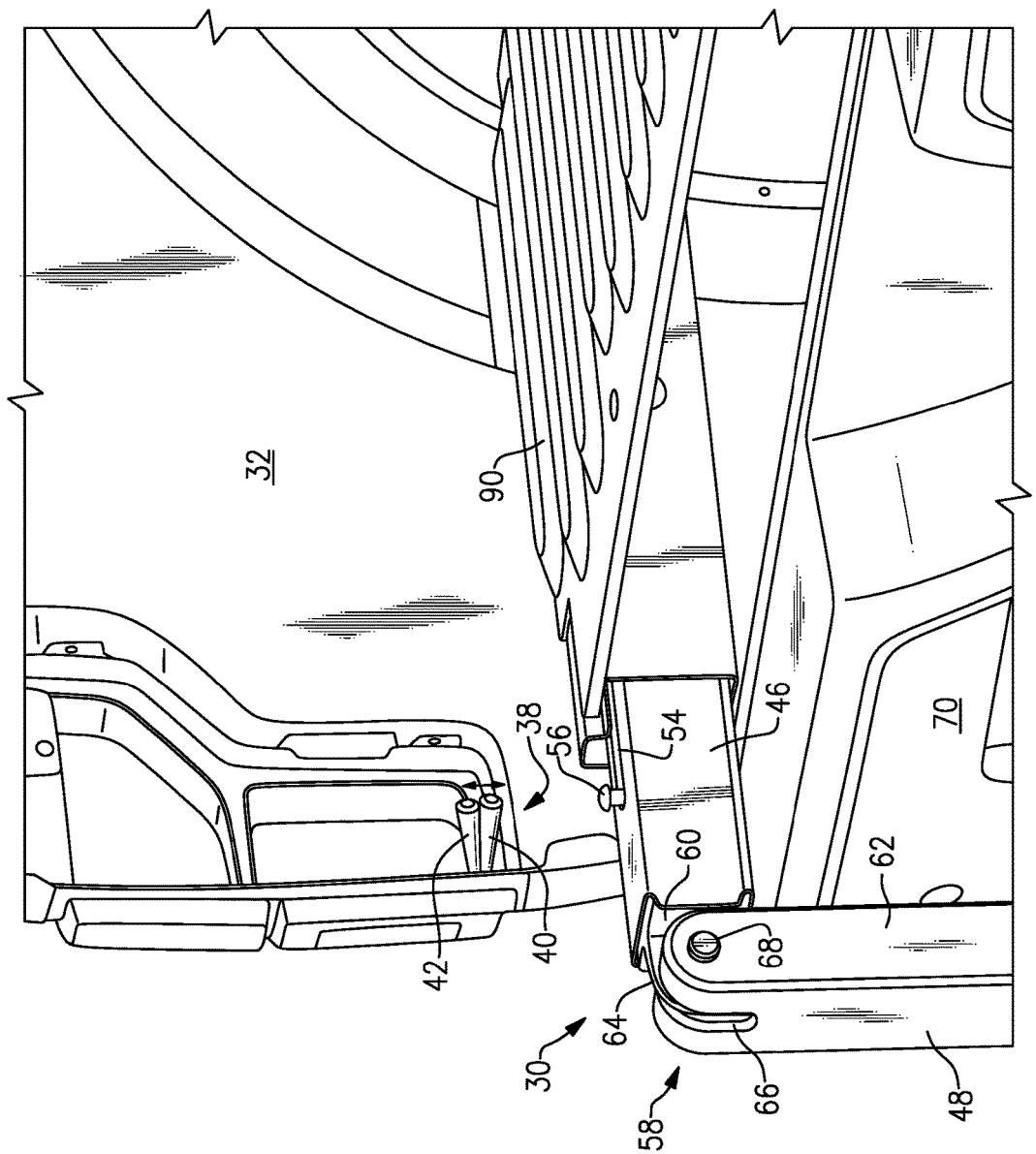
FIG. 6 is an enlarged perspective view of a pivot connect between rails that allows the tailgate to pivot to the step position.

FIG. 4 shows a position where the latch mechanism 28 has been released and the tailgate 18 is moving to the extended position. As discussed above, the rail assembly 30 is comprised of a plurality of rail members or portions that are arranged in a telescoping relationship with each other. FIGS. 4-5 show an example configuration where the rail assembly 30 includes at least a first rail 44, a second rail 46, and a third rail 48. The first rail 44 is held fixed to the vehicle body 32 and includes a slot 50 that receives a pin 52 that is coupled to the second rail 46 which is telescoped within the first rail 44. The second rail 46 slides outwardly from the first rail 44 until the pin 52 hits an end of the slot 50 to define a stop position for the second rail 46 as shown in FIG. 4.

The third rail 48 is telescoped within the second rail 44 and slides outwardly from the second rail 44 to the fully extended position shown in FIG. 5. The second rail 46 includes a slot 54 that receives a pin 56 (FIG. 6) that is coupled to the third rail 48. The third rail 48 slides outwardly from the second rail 46 until the pin 56 hits an end of the slot 54 to define a stop position for the third rail 48.

The apparatus 22 further includes a pivot 58 that is associated with the rail assembly 30 to allow the tailgate 18 to pivot downwardly from the extended position to provide the step. In one example best shown in FIGS. 5-6, the pivot 58 comprises a pivot connection formed within the third rail 48. The third rail 48 includes a first portion 60 that is held within the second rail 46 and a second portion 62 that extends outwardly of, and pivots relative to, the second rail 46. The first portion 60 includes a protrusion 64 that is received within a slot 66 formed within the second portion 62. A pivot pin 68 couples the second portion 62 to the protrusion 64 to allow the second portion 62 to pivot relative to the first portion 60.

Figure 7:
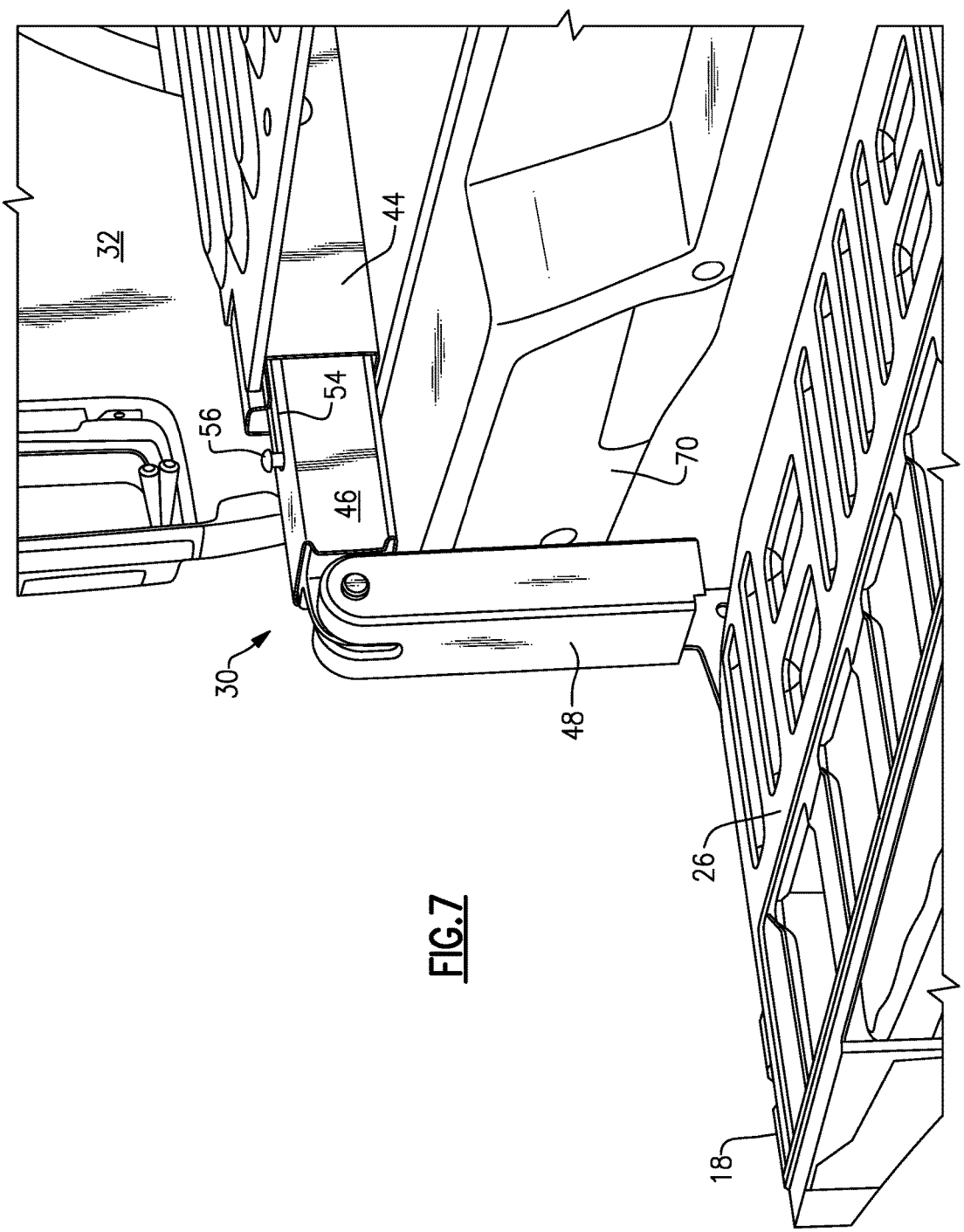
FIG. 7 is a perspective view showing the tailgate in the step position.

As best shown in FIG. 5, a distal end of the third rail 48 is coupled to the tailgate 18 via the bracket 34 of the latch mechanism 28. Thus, as the third rail 48 pivots relative to the second rail 46 the entire tailgate 18 is lowered to provide the step as shown in FIG. 7. The step surface 26 extends across an entire width and height of the tailgate 18 to provide a full or maximum allowable step area.

Figure 8:
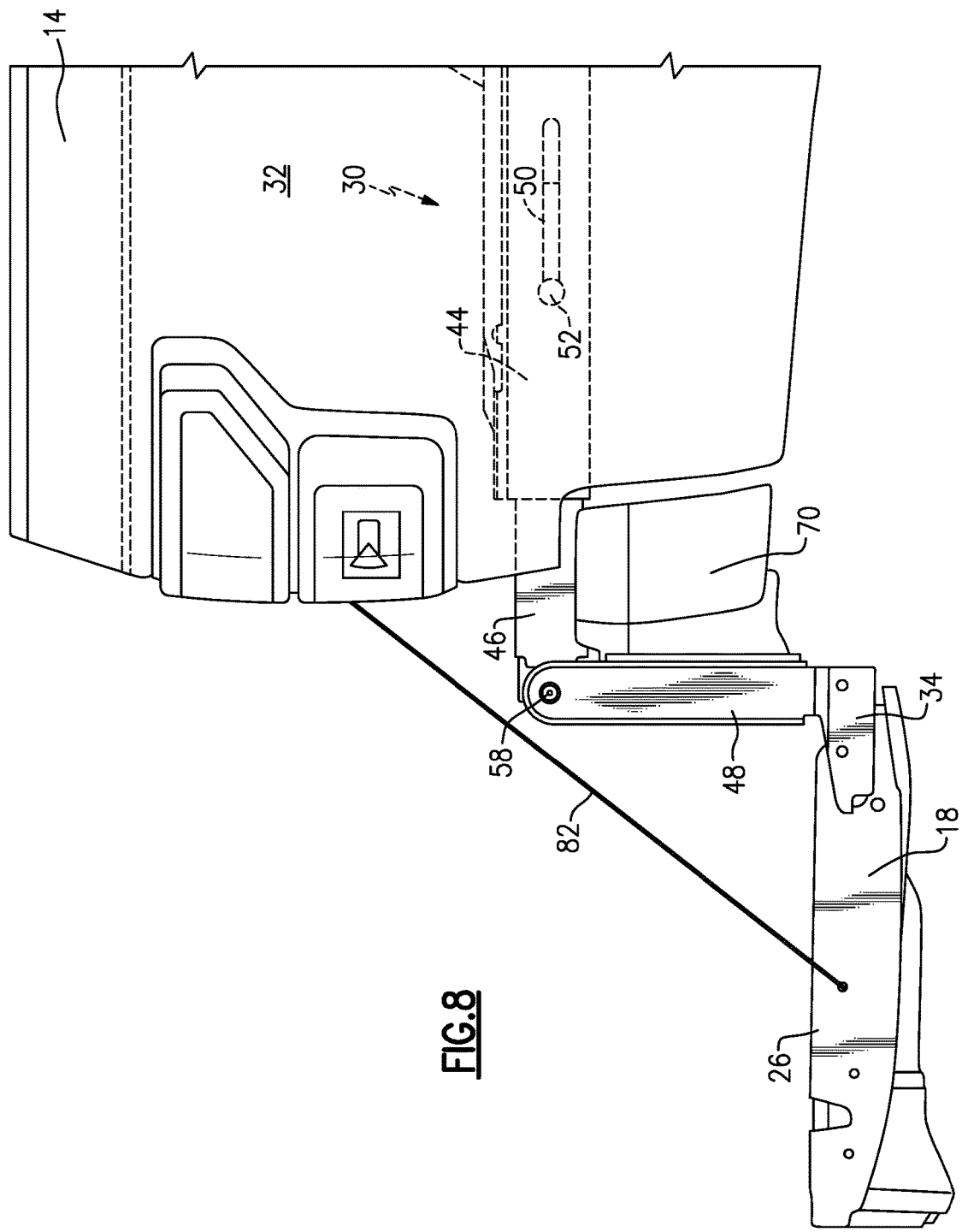
FIG. 8 is a side view of FIG. 7.

In one example shown in FIG. 8, a bumper 70 provides a stop for the pivoting third rail 48 such that the tailgate 18 is generally parallel to ground level 20 (FIG. 1) when in the step position. The bumper 70 further provides stability for the step during use.

Figure 9:
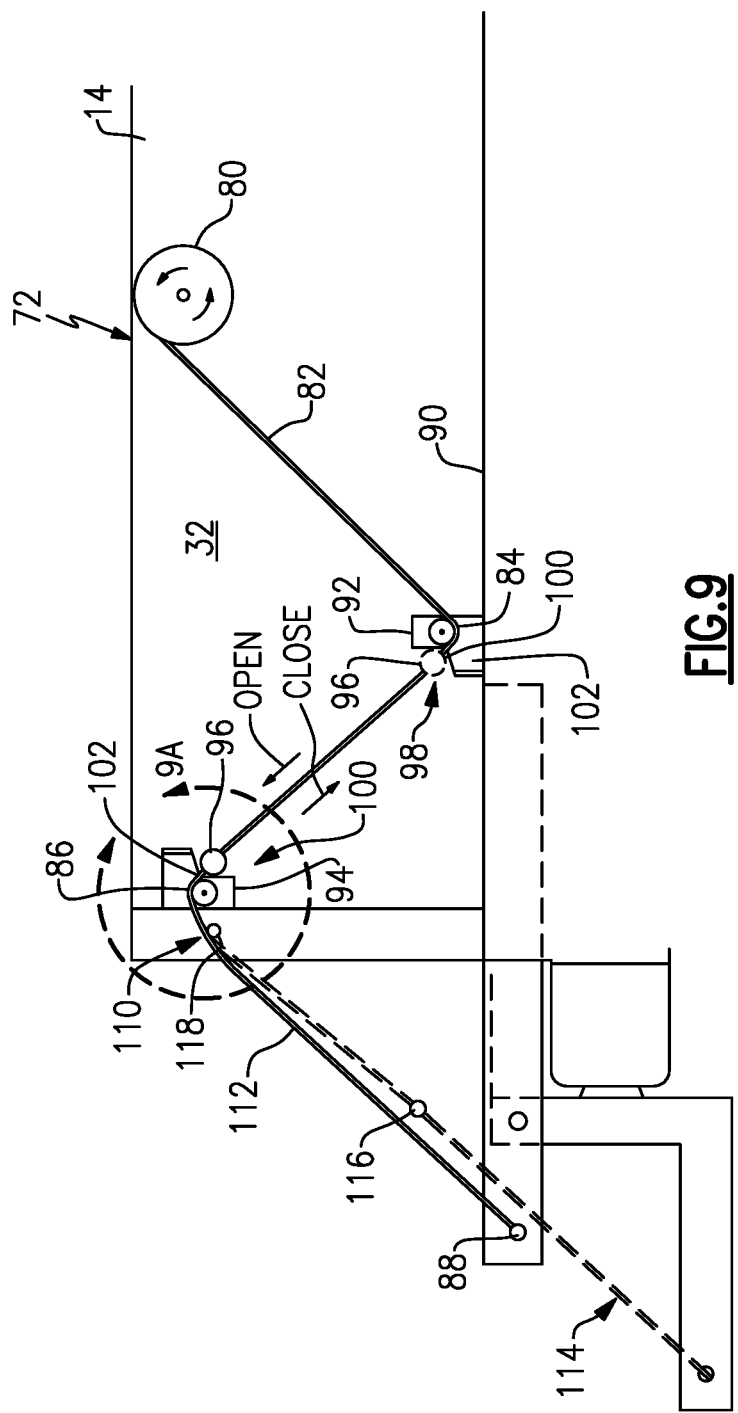
FIG. 9 is view similar to FIG. 8 and further showing a load assist mechanism.

As shown in FIG. 9, the apparatus 22 also includes a load assist 72 to provide assistance to move the tailgate 18 between the closed position, normal tailgate open position, and step position. The load assist 72 is mounted within the side wall 14 in a cavity formed between the inner and outer body panels. In one example, the load assist 72 includes a coil/recoil spring 80 that is mounted to the vehicle body 32. A cable 82 is coupled to the spring 80 and is wound around a first pulley 84 and a second pulley 86. A distal end 88 of the cable 82 is coupled to the tailgate 18.

In one example configuration, the first pulley 84 is mounted near a floor 90 of the cargo bed area 12 and the second pulley 86 is mounted near a top of the side wall 14 of the cargo bed area 12. The second pulley 86 is positioned axially aft of the first pulley 84. The first pulley 84 includes a first stop bracket 92 and the second pulley 86 includes a second stop bracket 94. A stop 96 is fixed for movement with the cable 82 as the spring 80 coils/recoils to assist movement of the tailgate 18 between the various positions. As indicated at 98, the stop 96 engages the first stop bracket 92 when the tailgate 18 is in the closed position, and the stop 96 engages the second stop bracket 94 when the tailgate 18 is in the step position as indicated at 100. A magnified view of the stop 96 in the step position is shown in FIG. 9A.

In one example, each of the first 92 and second 94 stop brackets comprise a L-shaped body 100 with a curved recess 102, and the stop 96 comprises a ball that is fixed to the cable 82. The stop ball 96 moves with the cable 82 between the first 92 and second 94 stop brackets and sits within the respective curved recess 102 when in the closed or fully deployed step positions.

The load assist 72 also includes an attachment portion 110 that is secured to the vehicle body 32 to allow the tailgate 18 to pivot to the normal tailgate deployed position as indicated at 112. The attachment portion 110 is released from the vehicle body 32 to allow the cable 82 to extend from the vehicle body 32 to lower the tailgate 18 to the step position as indicated at 114 (dashed cable).

Figure 10:
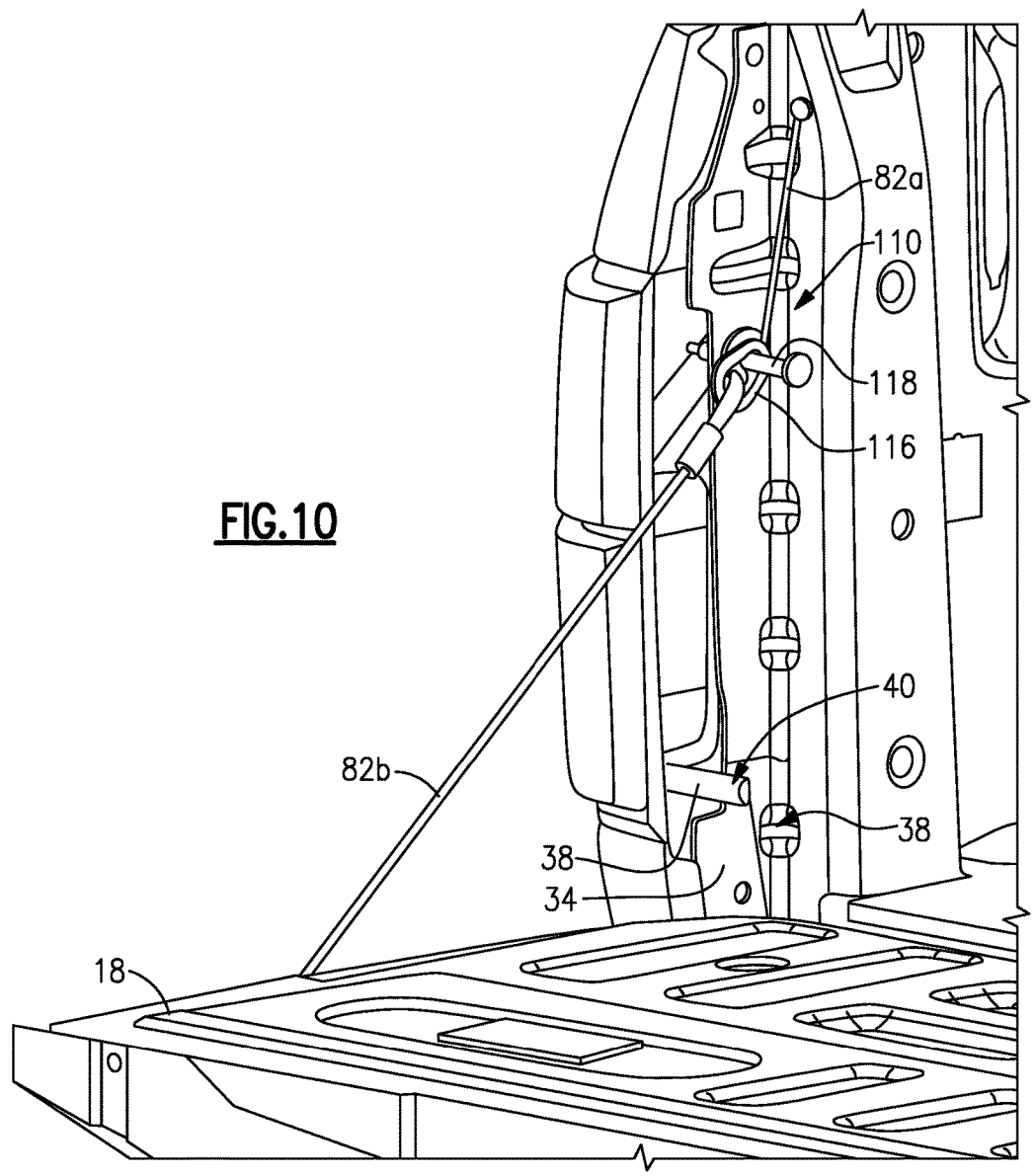
FIG. 10 is an enlarged perspective view of an attachment connection from the load assist of FIG. 9 that is shown in a normal tailgate deployed position.
Figure 11:
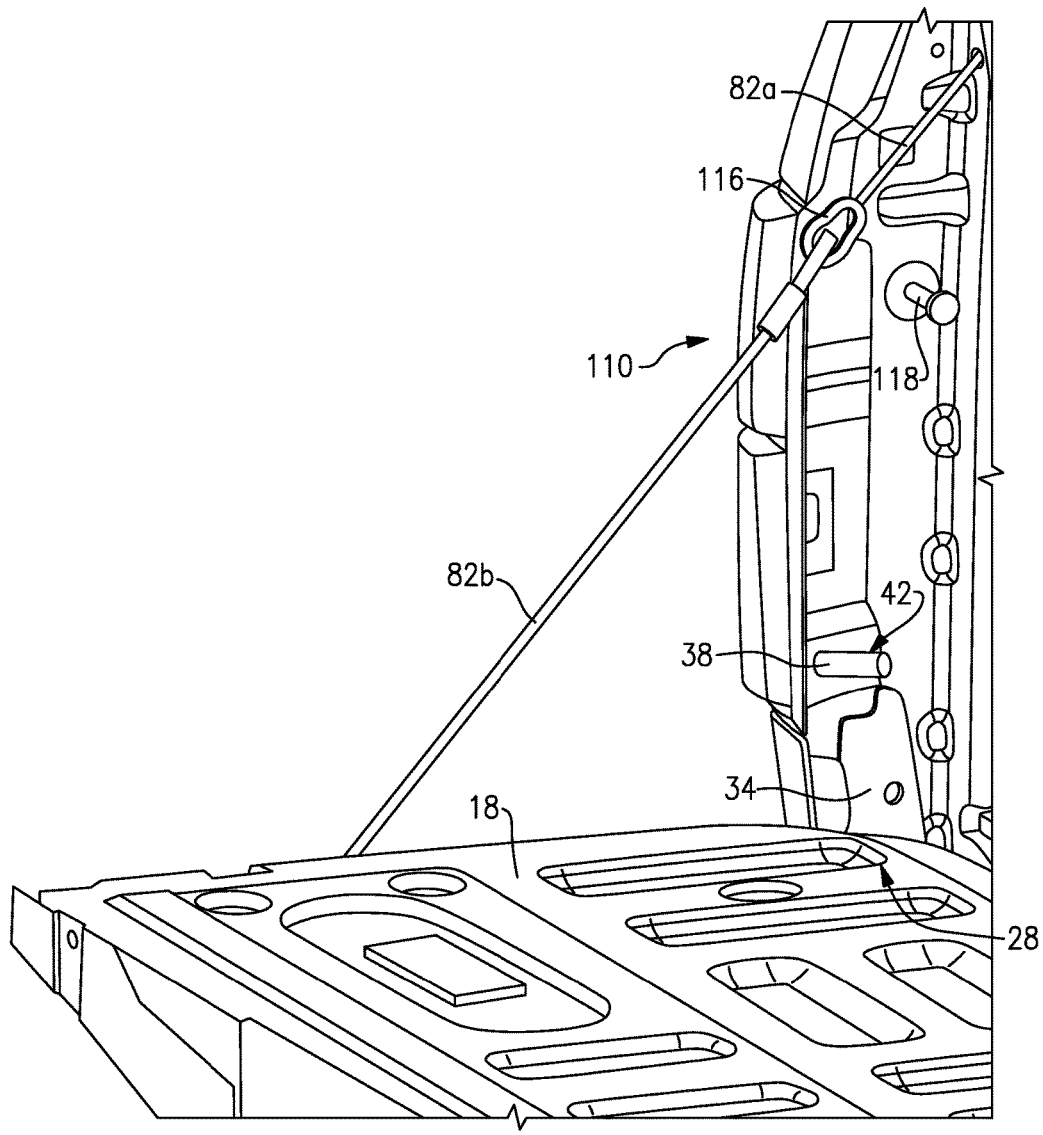
FIG. 11 is a view similar to FIG. 10 but showing the attachment portion released from the vehicle body to allow the tailgate to be lowered to the step position.

In one example shown in FIGS. 10-11, the attachment portion 110 comprises a loop structure 116 that cooperates with a protrusion or post 118 that is fixed to the vehicle body 32. The loop structure 116 connects cable portions 82*a*, 82*b* together. The loop structure 116 is coupled to the post 118 when in the tailgate deployed position as shown in FIG. 10. The loop structure 116 is detached from the post 118 as shown in FIG. 11, which allows cable portion 82*a* to extend outwardly from vehicle body 32 to allow the tailgate to be lowered into the fully deployed or step position as shown in FIG. 9.

The subject invention provides a tailgate assembly 18 that slides rearwardly on a pair of rail assemblies 30 with articulating arms/rails to lower the tailgate 18 to a desired ingress/egress height that is generally parallel to the ground 20. The entire tailgate 18 is used as a step, which provides for sure footing and a proper height to step from the ground 20 to the tailgate step, and then from the step into the cargo bed area 12 if necessary. The load assist 72 lessens the full weight of the tailgate assembly 18 for the user as the tailgate 18 travels between the various operational positions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a rail assembly supported by a vehicle body;
   a tailgate pivotable to a tailgate deployed position where the tailgate is flush with a floor of a cargo bed, the tailgate coupled to the rail assembly and configured to slide on rails to an extended position relative to the floor; and
   a pivot associated with the rails to allow the tailgate to pivot downwardly from the extended position to provide a step.

2. The apparatus according to claim 1, wherein the rail assembly comprises a first rail members fixed to the vehicle body, a second rail that is in a telescoping relationship with the first rail, and a third rail that is in a telescoping relationship with the second rail, and wherein the second rail slides outwardly from the first rail until a first stop hits a first stop face, and the third rail slides outwardly from the second rail until a second stop hits a second stop face such that the tailgate is in the extended position.

3. The apparatus according to claim 2, wherein the pivot comprises a pivotal connection to the third rail member.

4. The apparatus according to claim 1, wherein the tailgate includes an external surface and an inner surface that faces the cargo bed when in a closed position, and wherein the inner surface is flush with the floor when in the tailgate deployed position and provides a step surface when the tailgate is pivoted to a step position.

5. The apparatus according to claim 4, wherein the step surface extends across an entire width and height of the tailgate and is generally parallel to ground level when in the step position.

6. The apparatus according to claim 1, including a latch that is selectively actuated to allow the tailgate to slide from a closed position to the extended position wherein the latch includes a first latch member fixed for movement with the tailgate and a second latch member that is fixed to the vehicle body.

7. The apparatus according to claim 1, including a load assist to provide assistance to move the tailgate between a closed position and a step position, wherein the load assist includes an attachment portion that is secured to the vehicle body to allow a cable to pivot the tailgate to the tailgate deployed position, and wherein the attachment portion is releasable from the vehicle body to allow the cable to extend from the vehicle body to lower the tailgate to a step position.

8. The apparatus according to claim 7, wherein the load assist comprises a spring assembly mounted to the vehicle body.

9. An apparatus, comprising:
a rail assembly supported by a vehicle body;
a tailgate coupled to the rail assembly and configured to slide on rails to an extended position relative to the vehicle body;
a pivot associated with the rails to allow the tailgate to pivot downwardly from the extended position to provide a step; and
a load assist to provide assistance to move the tailgate between a closed position and a step position, the load assist including a spring assembly mounted to the vehicle body, and wherein the spring assembly is coupled to a cable that is wound around at least first and second pulleys, and including a stop moveable with the cable and that stops at the first pulley in the closed position and stops at the second pulley in the step position.

10. The apparatus according to claim 9, wherein the cable is coupled to the tailgate and includes an attachment portion that is secured to the vehicle body to allow the tailgate to pivot to a tailgate deployed position that is between the closed position and step position, and wherein the attachment portion is released from the vehicle body to allow the cable to extend from the vehicle body to lower the tailgate to the step position.

11. The apparatus according to claim 10, wherein the attachment portion comprises a loop, and including a post fixed to the vehicle body wherein the loop is coupled to the post when in the tailgate deployed position, and wherein the loop is detached from the post when in the step position.

12. An apparatus, comprising:
a pair of rails supported on opposing sides of a vehicle body;
a tailgate slidingly coupled to the rails; and
a load assist with a spring and cable to provide assistance to move the tailgate between a closed position, a tailgate deployed position where the tailgate is flush with a floor extending between the opposing sides, and a step position where the tailgate is lowered relative to the floor.

13. The apparatus according to claim 12, wherein the tailgate slides on the rails to an extended position relative to the vehicle body, and including a pivot associated with the rails to allow the tailgate to pivot downwardly from the extended position to the step position.

14. The apparatus according to claim 13, wherein each rail comprises a plurality of rail members that are in a telescoping relationship with each other, and wherein the pivot comprises a pivotal connection to at least one rail member.

15. The apparatus according to claim 13, including a latch that is selectively actuated allow the tailgate to slide from the closed position to the extended position.

16. The apparatus according to claim 12, wherein the spring is mounted to the vehicle body and the cable is coupled to the spring and is wound around at least first and second pulleys, and including a stop moveable with the cable to stop at the first pulley in the closed position and to stop at the second pulley in the step position.

17. The apparatus according to claim 16, wherein the cable is coupled to the tailgate and includes an attachment portion that is secured to the vehicle body to allow the tailgate to pivot to the tailgate deployed position, and wherein the attachment portion is released from the vehicle body to allow the cable to extend from the vehicle body to lower the tailgate to the step position.

18. The apparatus according to claim 12, wherein the load assist includes an attachment portion that is secured to the vehicle body to allow the cable to pivot the tailgate to the tailgate deployed position, and wherein the attachment portion is releasable from the vehicle body to allow the cable to extend from the vehicle body to lower the tailgate to a step position.

19. A method, comprising:
sliding a tailgate to an extended position relative to a vehicle body;
selectively pivoting the tailgate between a closed position, a tailgate deployed position where the tailgate is flush with a cargo bed floor, and a step position where the tailgate is lowered relative to the floor; and
providing a load assist with a spring and cable to move the tailgate between the closed, tailgate deployed, and step positions.

20. The method according to claim 19, including selectively locking the tailgate to the vehicle body to prevent the tailgate from being moved to the extended position.

21. The method according to claim 19, including securing an attachment portion to the vehicle body to allow the cable to pivot the tailgate to the tailgate deployed position, and selectively releasing the attachment portion from the vehicle body to allow the cable to extend from the vehicle body to lower the tailgate to the step position.

* * * * *

UNITED STATES PATENT AND TRADEMARK OFFICE
CERTIFICATE OF CORRECTION

PATENT NO. : 10,081,303 B1
APPLICATION NO. : 15/583064
DATED : September 25, 2018
INVENTOR(S) : Tom Thanh Ngo and Martin Countegan Page 1 of 1

It is certified that error appears in the above-identified patent and that said Letters Patent is hereby corrected as shown below:

In the Claims

In Claim 2, Column 6, Line 45; replace "first rail members fixed" with --first rail member fixed--

In Claim 6, Column 6, Line 67; replace "position wherein" with --position, wherein--

In Claim 15, Column 8, Line 11; replace "actuated allow" with --actuated to allow--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*